United States Patent
Kang

(10) Patent No.: US 10,933,838 B2
(45) Date of Patent: Mar. 2, 2021

(54) KNEE AIR BAG APPARATUS AND METHOD FOR FOLDING THE SAME

(71) Applicant: HYUNDAI MOBIS CO., LTD., Seoul (KR)

(72) Inventor: I Seul Kang, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 117 days.

(21) Appl. No.: 16/125,537

(22) Filed: Sep. 7, 2018

(65) Prior Publication Data

US 2019/0092267 A1  Mar. 28, 2019

(30) Foreign Application Priority Data

Sep. 27, 2017 (KR) .................. 10-2017-0125103

(51) Int. Cl.
*B60R 21/16* (2006.01)
*B60R 21/237* (2006.01)
*B60R 21/217* (2011.01)
*B60R 21/206* (2011.01)
*B60R 21/231* (2011.01)
*B60R 21/00* (2006.01)

(52) U.S. Cl.
CPC .......... *B60R 21/237* (2013.01); *B60R 21/206* (2013.01); *B60R 21/217* (2013.01); *B60R 21/231* (2013.01); *B60R 2021/0051* (2013.01); *B60R 2021/23169* (2013.01)

(58) Field of Classification Search
CPC . B60R 21/206; B60R 21/233; B60R 21/2338; B60R 21/237; B60R 21/261; B60R 21/2165; B60R 21/2171; B60R 21/2342; B60R 2021/0051; B60R 2021/161; B60R 2021/23169; B60R 2021/23382; B60R 2021/23547; B60R 2021/23595
USPC ............................................ 280/743.1, 743.2
See application file for complete search history.

(56) References Cited

U.S. PATENT DOCUMENTS

| | | | | |
|---|---|---|---|---|
| 5,899,495 A * | 5/1999 | Yamamoto | .......... | B60R 21/2342 280/743.1 |
| 6,206,409 B1 * | 3/2001 | Kato | .................... | B60R 21/201 280/728.2 |
| 7,445,239 B2 * | 11/2008 | Okada | ................... | B60R 21/237 280/743.1 |
| 7,878,540 B2 * | 2/2011 | Takimoto | ............... | B60R 21/206 280/743.2 |
| 7,926,844 B2 * | 4/2011 | Williams | ............... | B60R 21/237 280/732 |
| 7,954,845 B2 * | 6/2011 | Moritani | ............... | B60R 21/206 280/730.1 |
| 7,963,550 B2 * | 6/2011 | Hong | .................... | B60R 21/206 280/729 |

(Continued)

*Primary Examiner* — Toan C To
(74) *Attorney, Agent, or Firm* — Knobbe Martens Olson & Bear LLP

(57) ABSTRACT

A method for folding a knee airbag may include: folding both sides of an airbag cushion a plurality of times, and fixing the folded portion of the airbag cushion; forming a roll folding part by rolling one side of the airbag cushion of which both sides are folded a plurality of times; and folding the other side of the airbag cushion toward the roll folding part, with the roll folding part formed at the one side of the airbag cushion, and fixing the other side of the airbag cushion.

9 Claims, 16 Drawing Sheets

(56) References Cited

U.S. PATENT DOCUMENTS

| | | | | |
|---|---|---|---|---|
| 8,272,664 | B2* | 9/2012 | Benny | B60R 21/201 |
| | | | | 280/728.1 |
| 8,540,276 | B2* | 9/2013 | Schneider | B60R 21/206 |
| | | | | 280/730.1 |
| 2004/0251669 | A1* | 12/2004 | Fischer | B60R 21/237 |
| | | | | 280/743.1 |
| 2006/0244248 | A1* | 11/2006 | Rose | B60R 21/237 |
| | | | | 280/743.1 |
| 2008/0284140 | A1* | 11/2008 | Choi | B60R 21/2346 |
| | | | | 280/728.2 |
| 2012/0326421 | A1* | 12/2012 | Motomochi | B60R 21/205 |
| | | | | 280/732 |

* cited by examiner

KNEE AIR BAG APPARATUS AND METHOD FOR FOLDING THE SAME

CROSS-REFERENCES TO RELATED APPLICATIONS

The present application claims priority to Korean application number 10-2017-0125103, filed on Sep. 27, 2017, which is incorporated by reference in its entirety.

BACKGROUND OF THE INVENTION

The present invention relates to a knee airbag apparatus and a method for folding the same, and more particularly, to a knee airbag apparatus and a method for folding the same, which can increase productivity by improving a folding operation of an airbag cushion, and prevent the airbag cushion from being distorted or swayed while the airbag cushion is deployed.

In general, a vehicle includes airbags to protect a passenger. The airbags are installed at various positions depending on body parts which need to be protected. A knee airbag is disposed in front of a front seat. The knee airbag is installed in a housing, with its airbag cushion folded. That is, with the bottom of the airbag cushion folded in a zigzag manner, an operator manually arranges a tether and an unfolded portion of the airbag cushion, transfers the airbag cushion to the next process, and then assembles the airbag cushion to a cushion cover housing with the airbag cushion held by tongs.

Since the operation of folding the bottom of the airbag cushion in a zigzag manner and then folding the left and right sides of the airbag cushion in a zigzag manner cannot be automated, the productivity may reduced. Furthermore, since an outlet of an inflator is eccentrically connected to one side of the airbag cushion, the airbag cushion may be distorted or swayed to one side when deployed. Therefore, there is a demand for a device capable of solving the problem.

SUMMARY OF THE INVENTION

Embodiments of the present invention are directed to a knee airbag apparatus and a method for folding the same, which can increase productivity by improving a folding operation of an airbag cushion, and prevent the airbag cushion from being distorted or swayed while the airbag cushion is deployed.

In one embodiment, a method for folding a knee airbag may include: folding both sides of an airbag cushion a plurality of times, and fixing the folded portion of the airbag cushion; forming a roll folding part by rolling one side of the airbag cushion of which both sides are folded a plurality of times; and folding the other side of the airbag cushion toward the roll folding part, with the roll folding part formed at the one side of the airbag cushion, and fixing the other side of the airbag cushion.

Both sides of the airbag cushion may be folded in a zigzag manner so as to form side folding parts.

The folded state of the side folding part may be maintained by a fixing part installed through the side folding part.

In the forming of the roll folding part, the roll folding part and the other side of the airbag cushion may be separated from each other by a preset distance.

The other side of the airbag cushion may be folded toward the roll folding part so as to cover the outside of the roll folding part.

A cushion cover may be installed outside the airbag cushion, and the airbag cushion and the cushion cover may be folded and connected to a fixing bolt of an inflator.

In another embodiment, a knee airbag apparatus may include: an inflator installed in a housing and configured to inject gas; an airbag cushion having a cushion body of which both sides are folded a plurality of times, the cushion body being connected to the inflator, wherein a roll folding part is formed by rolling one side of the folded portion of the cushion body, and the other side of the cushion body is folded toward the roll folding part; and a cushion cover connected to the airbag cushion, and torn to form a passage in which the airbag cushion is deployed, when the airbag cushion is deployed.

Both sides of the cushion body in the airbag cushion may be folded in a zigzag manner so as to form side folding parts.

The cushion cover may include: a cover body fixed to the rear surface of the cushion body; and a connection part protruded from the cover body, and having a connection hole connected to a fixing bolt of the inflator. A cutting line may be horizontally formed inside the cover body.

The knee airbag apparatus may further include a fixing part installed through the side folding part so as to maintain the folded state of the side folding part.

DESCRIPTION OF SPECIFIC EMBODIMENTS

Hereafter, a knee airbag apparatus and a method for folding the same in accordance with an embodiment of the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
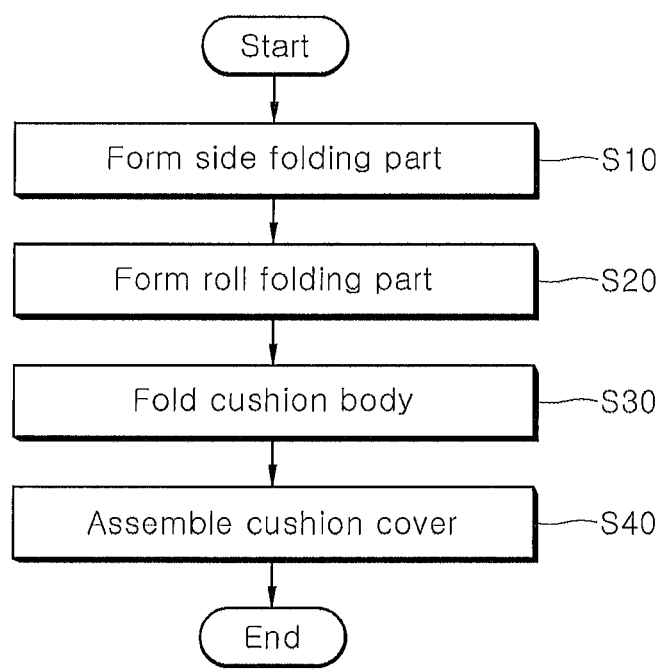
FIG. 1 is a flowchart illustrating a method for folding a knee airbag apparatus in accordance with an embodiment of the present invention.
Figure 2:
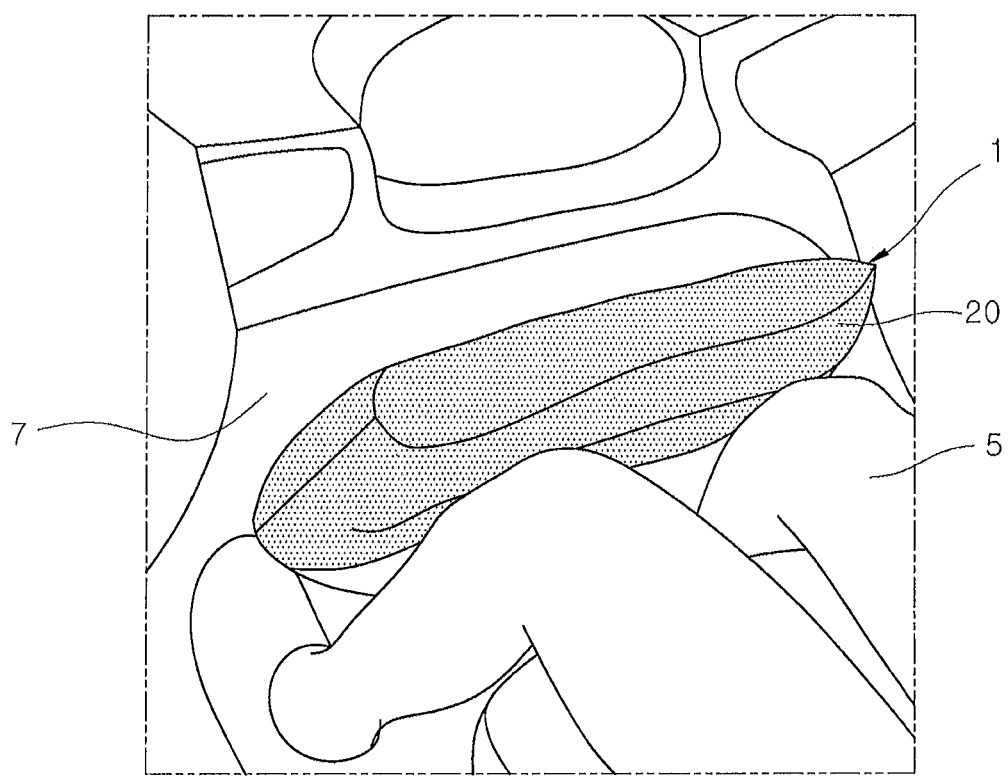
FIG. 2 schematically illustrates that the knee airbag apparatus in accordance with the embodiment of the present invention is operated.
Figure 3:
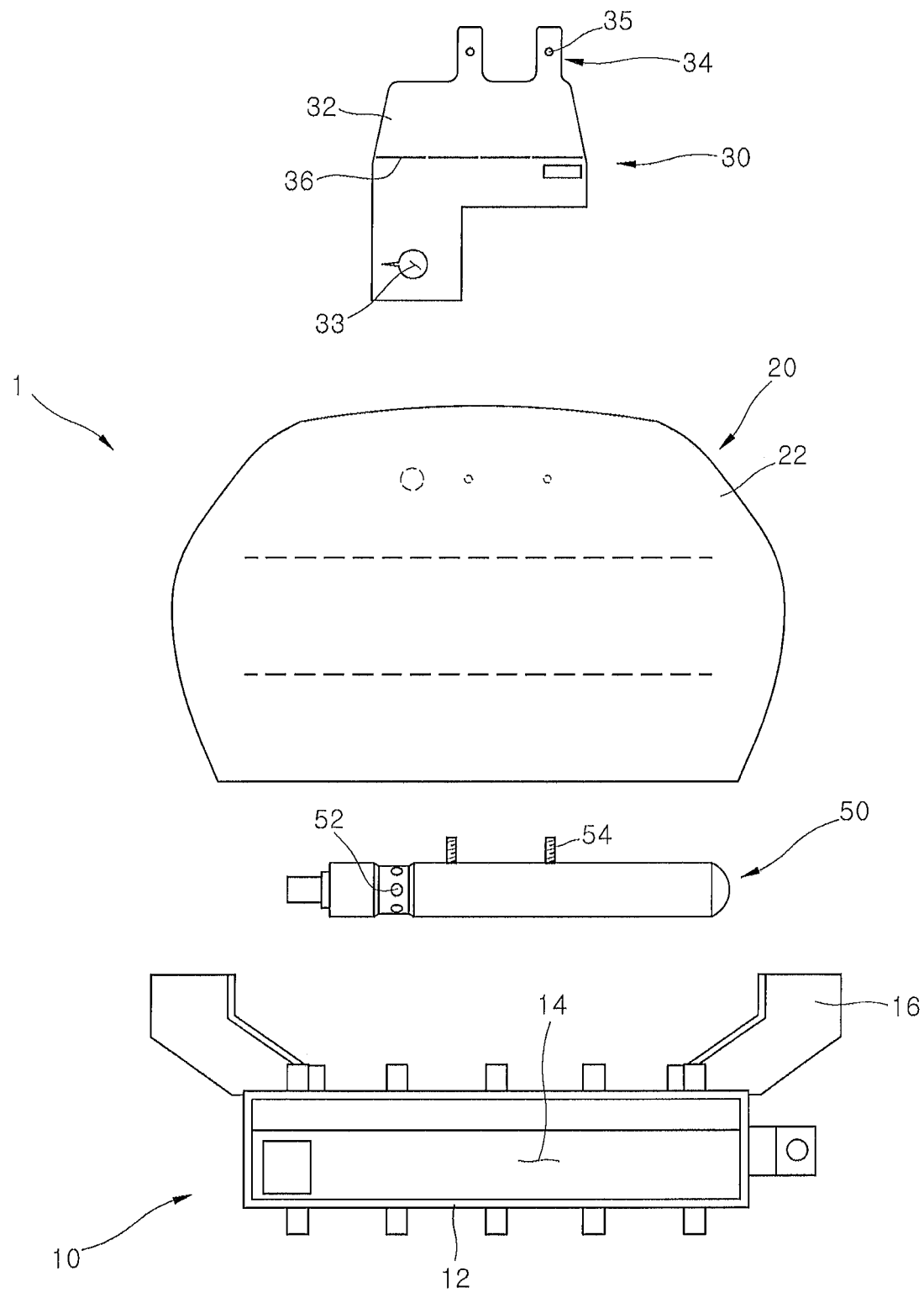
FIG. 3 is an exploded view illustrating main components of an airbag cushion in accordance with the embodiment of the present invention.
Figure 4:
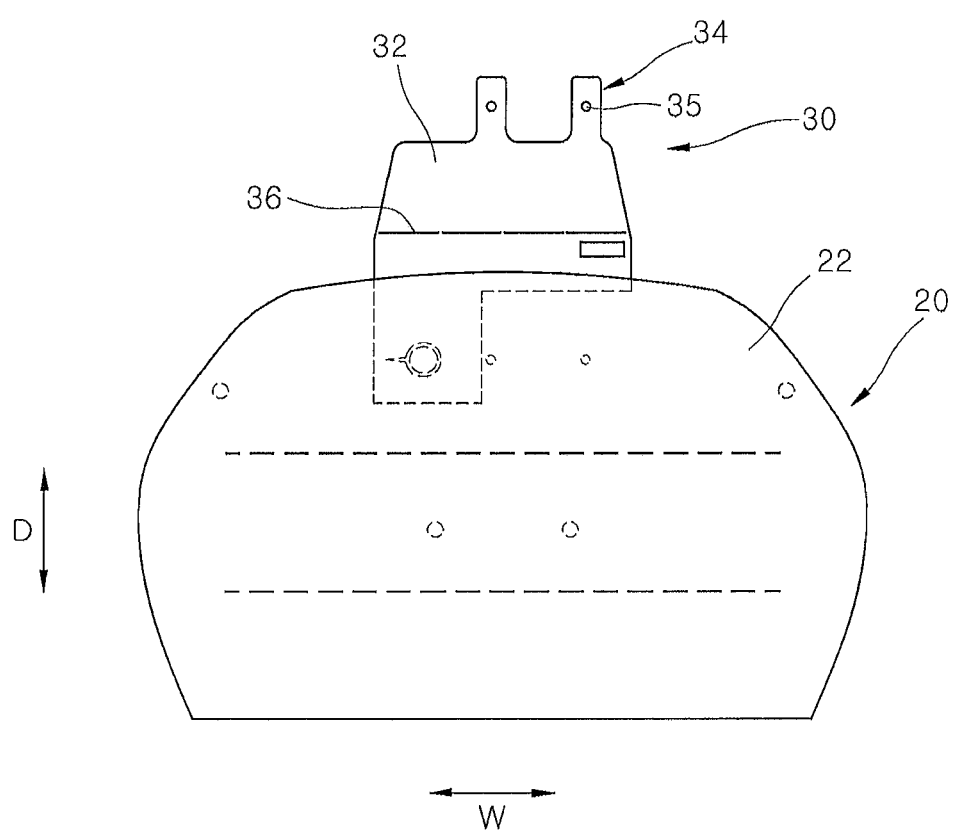
FIG. 4 is a front view illustrating that a cushion cover is connected to the airbag cushion in accordance with the embodiment of the present invention.
Figure 5:
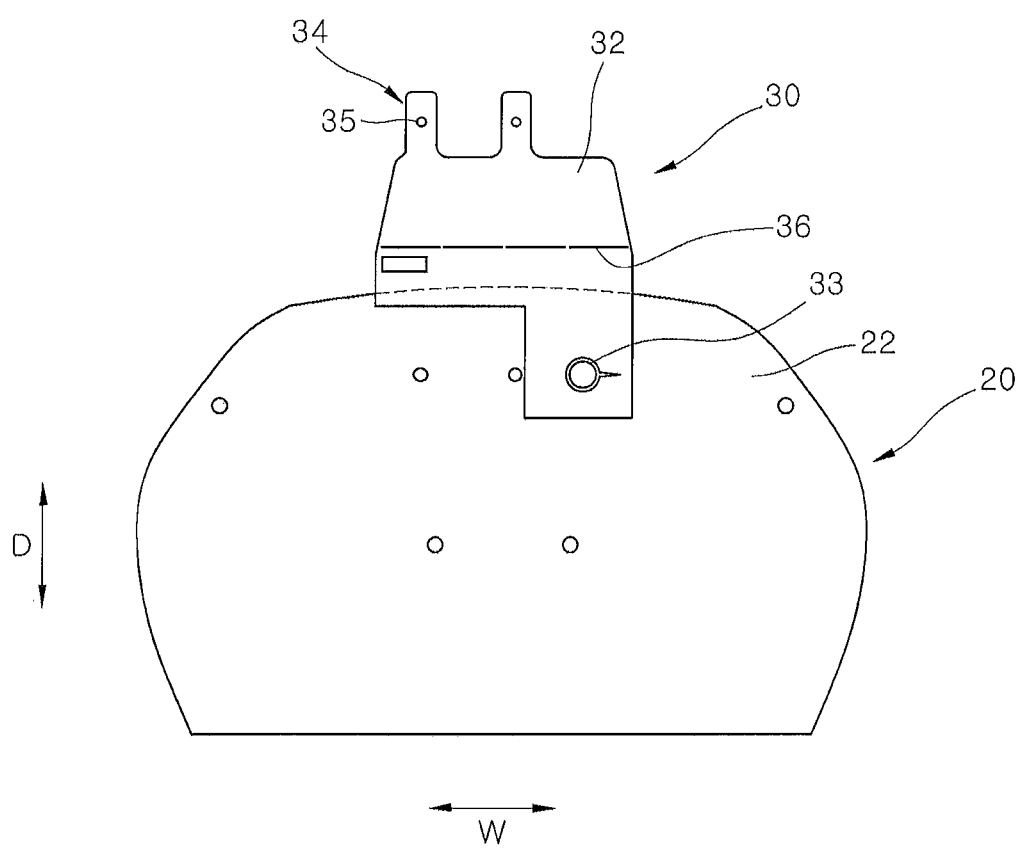
FIG. 5 is a rear view illustrating that the cushion cover is connected to the airbag cushion in accordance with the embodiment of the present invention.
Figure 6:
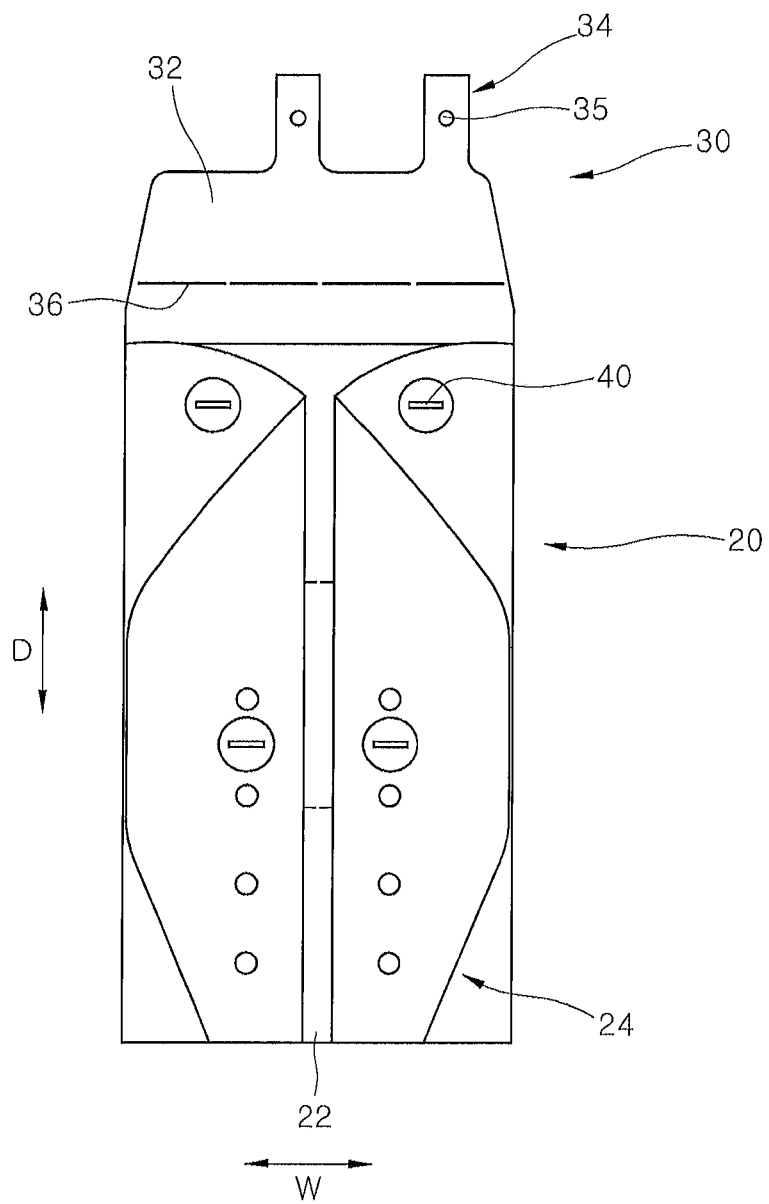
FIG. 6 is a front view illustrating that both sides of the airbag cushion in accordance with the embodiment of the present invention are folded to form side folding parts.
Figure 7:
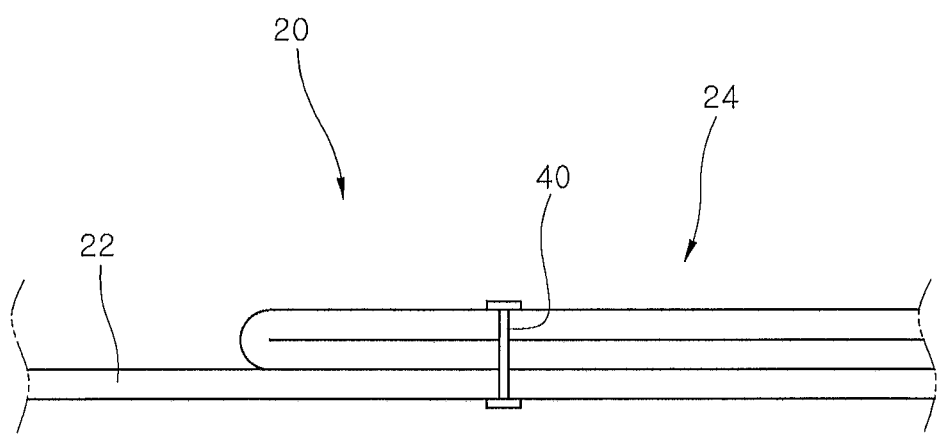
FIG. 7 illustrates a fixing part for maintaining the folded state of the side folding part in accordance with the embodiment of the present invention.
Figure 8:
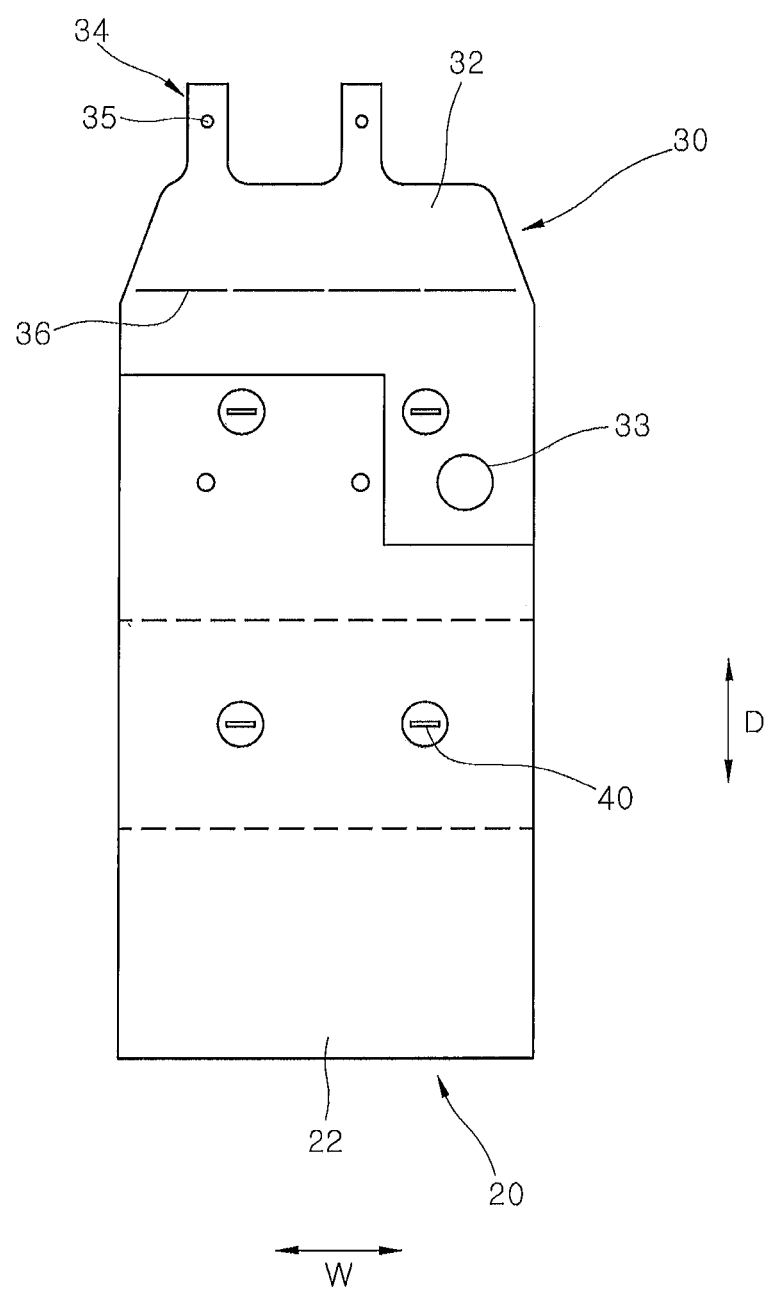
FIG. 8 is a rear view illustrating that both sides of the airbag cushion in accordance with the embodiment of the present invention are folded to form the side folding parts.
Figure 9:
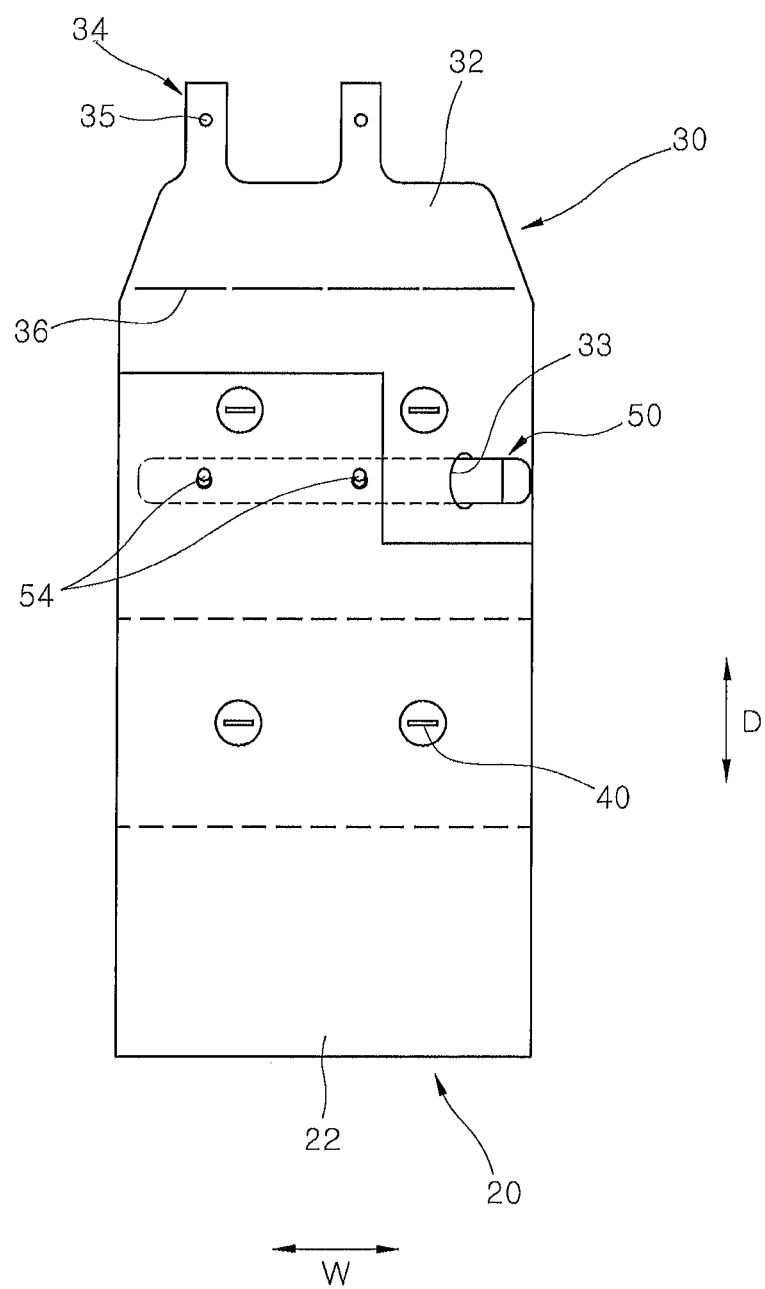
FIG. 9 illustrates that an inflator is coupled to the airbag cushion and the cushion cover in accordance with the embodiment of the present invention.
Figure 10:
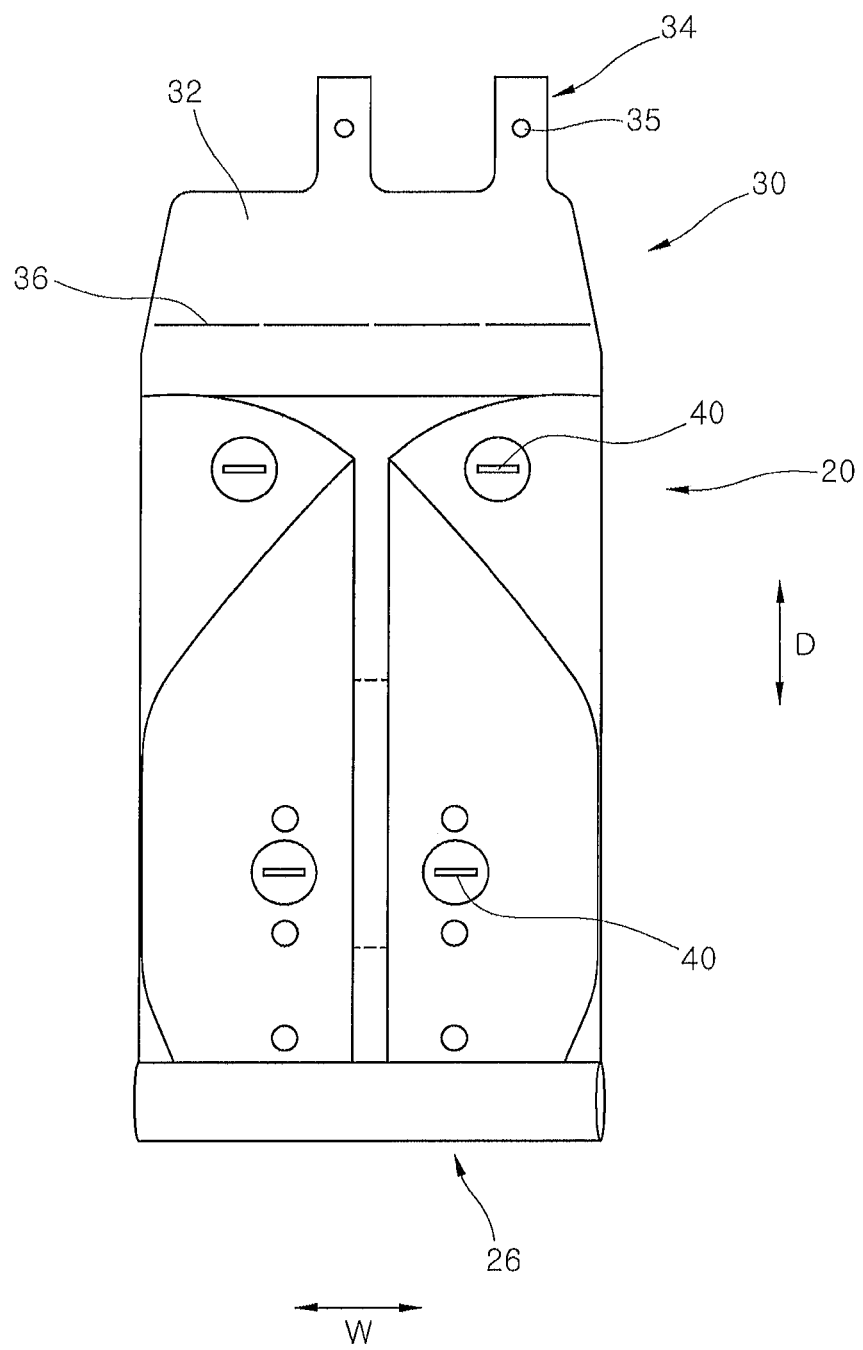
FIG. 10 illustrates that a roll folding part is formed at the bottom of the airbag cushion in accordance with the embodiment of the present invention.
Figure 11:
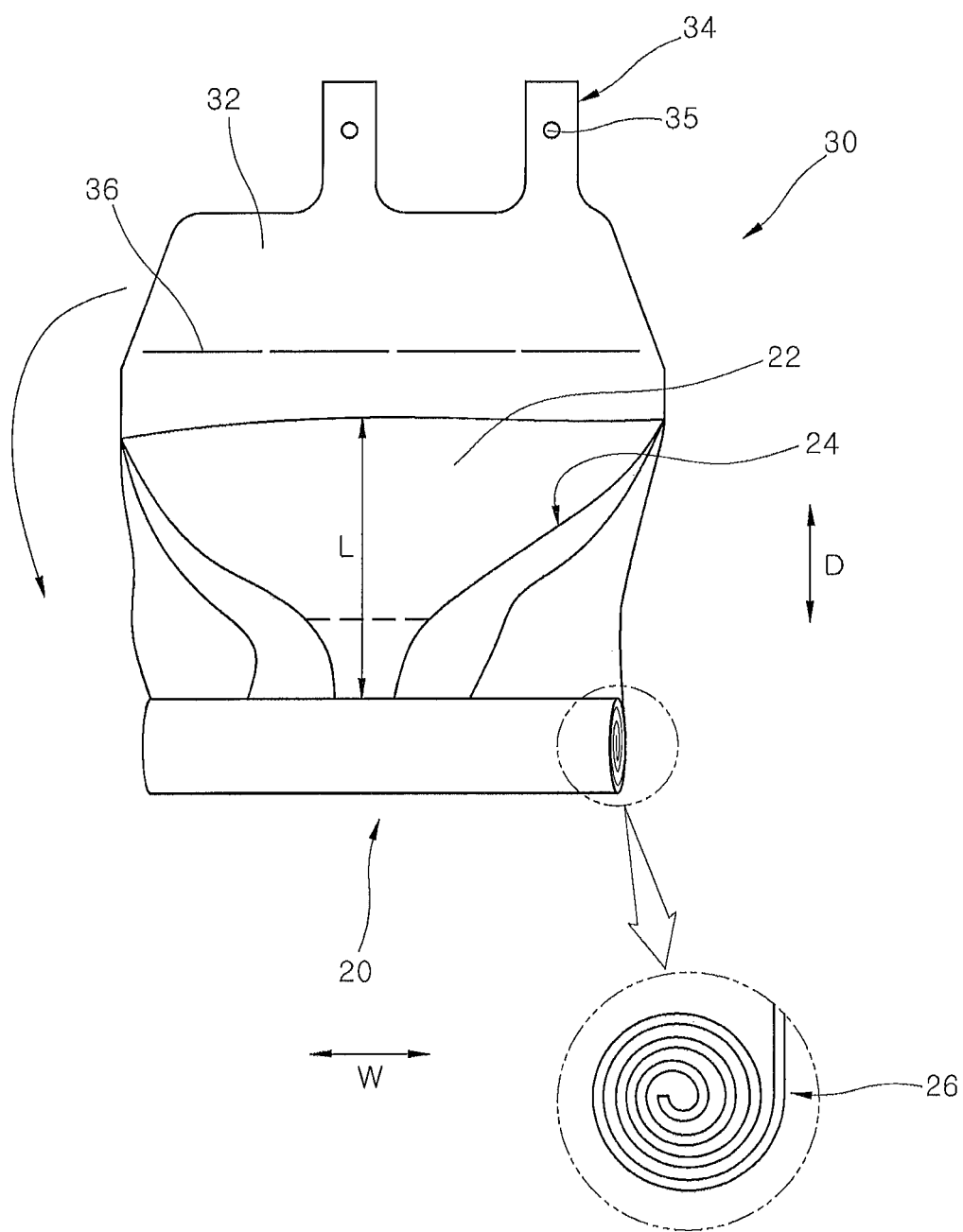
FIG. 11 illustrates that the top of the airbag cushion in accordance with the embodiment of the present invention is folded toward the roll folding part.
Figure 12:
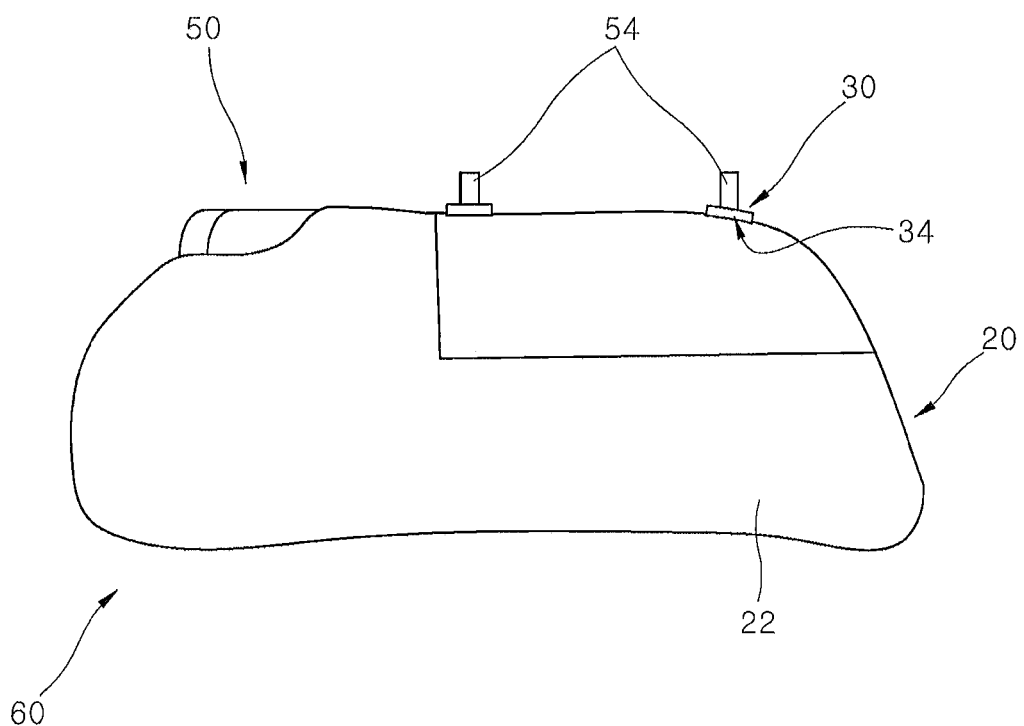
FIG. 12 illustrates that the cushion cover is assembled to the airbag cushion in accordance with the embodiment of the present invention.
Figure 13:
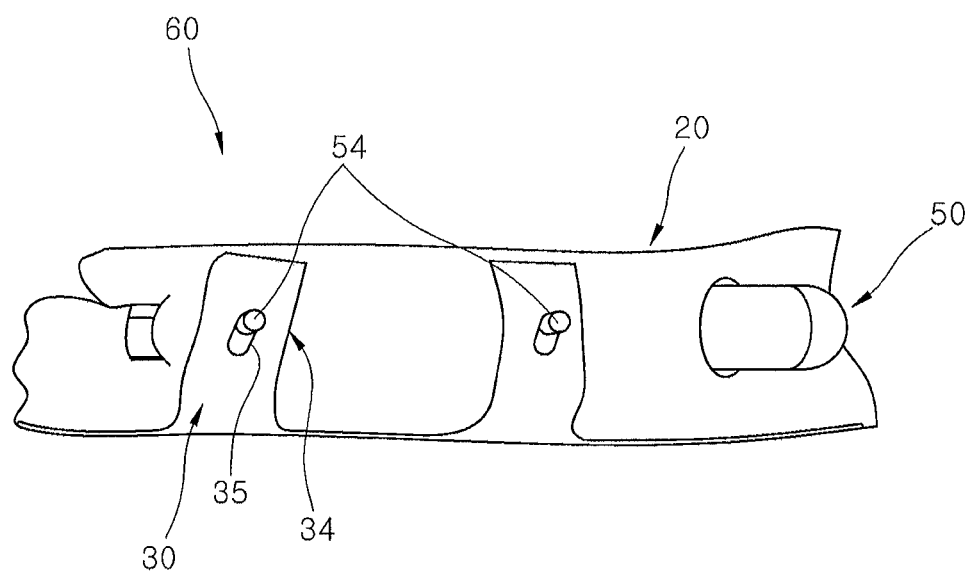
FIG. 13 illustrates a cushion pack in accordance with the embodiment of the present invention.
Figure 14:
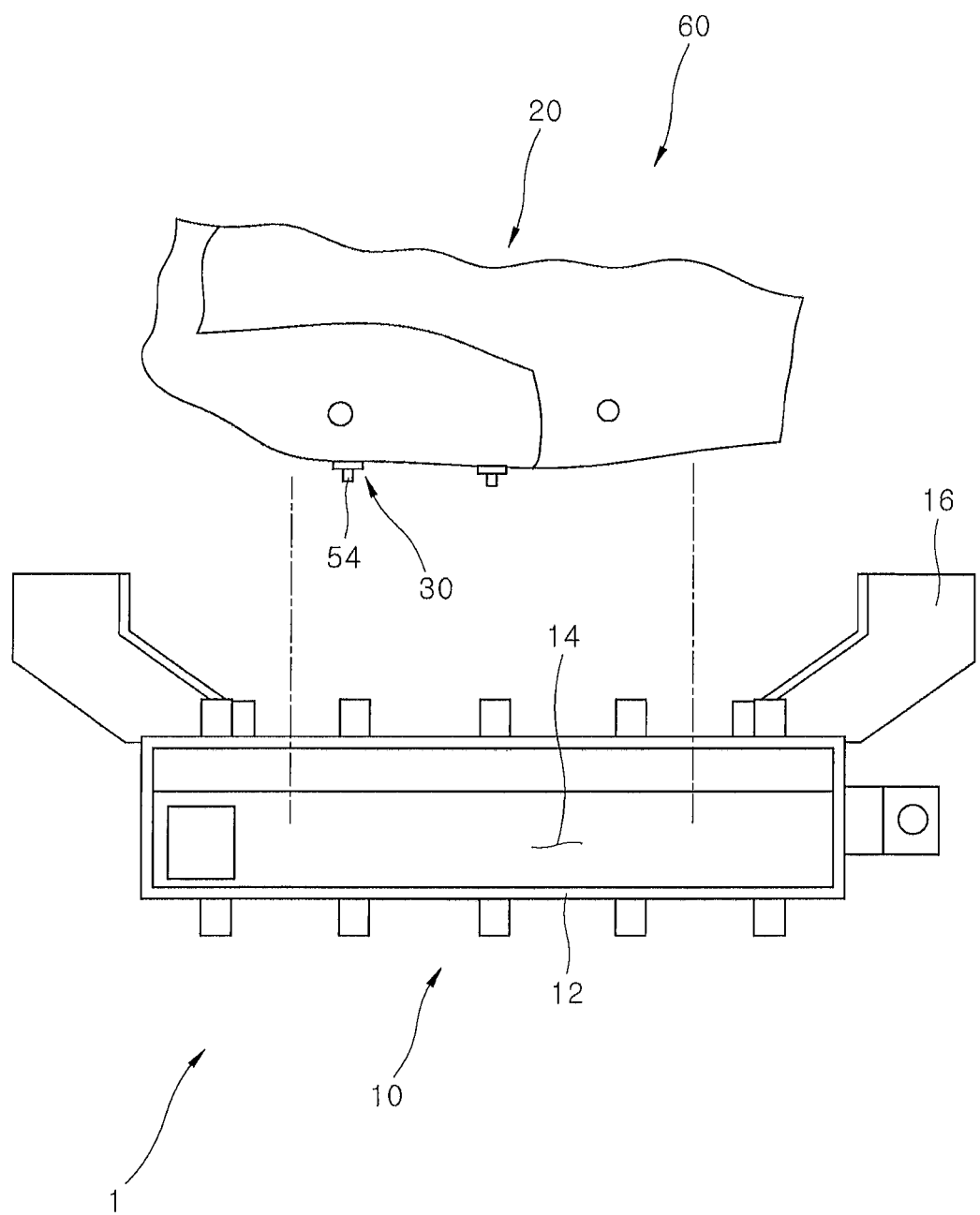
FIG. 14 illustrates that the cushion pack is separated from the housing in accordance with the embodiment of the present invention.
Figure 15:
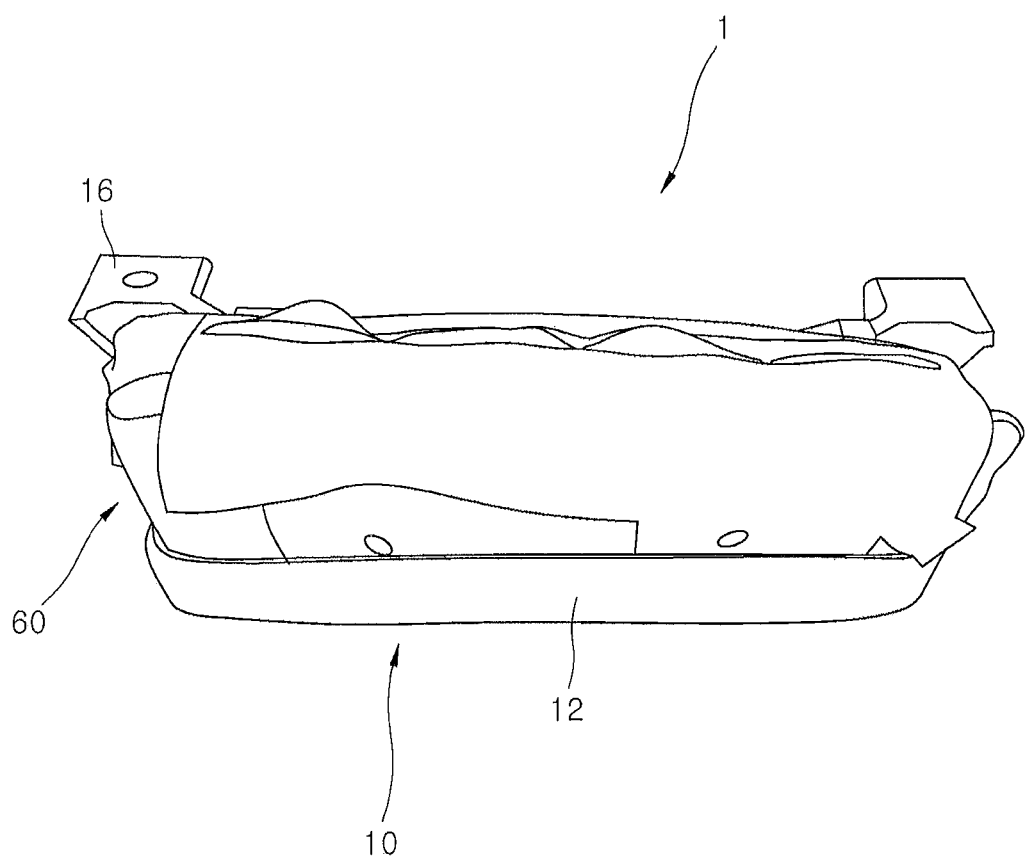
FIG. 15 illustrates that the cushion pack is coupled to the housing in accordance with the embodiment of the present invention.
Figure 16:
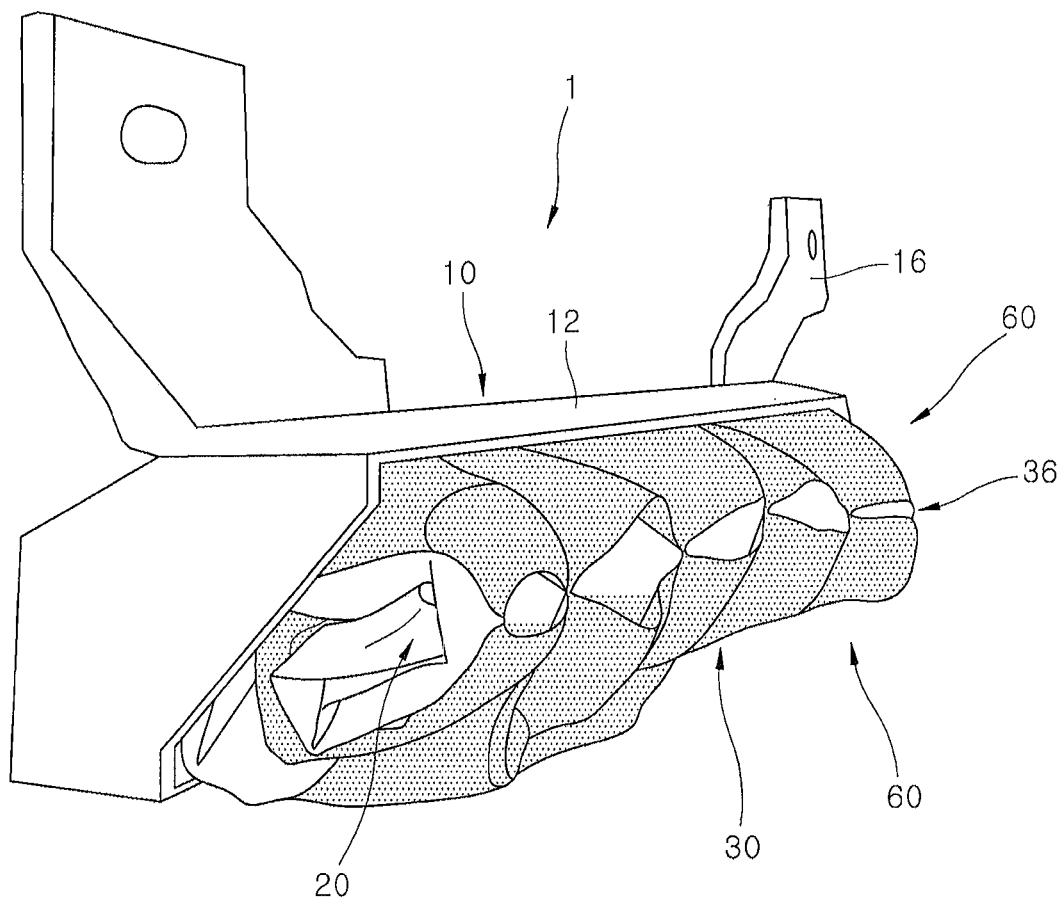
FIG. 16 illustrates the location of a cutting line with the cushion pack mounted in the housing in accordance with the embodiment of the present invention.

FIG. 1 is a flowchart illustrating a method for folding a knee airbag apparatus in accordance with an embodiment of the present invention, FIG. 2 schematically illustrates that the knee airbag apparatus in accordance with the embodiment of the present invention is operated, FIG. 3 is an exploded view illustrating main components of an airbag cushion in accordance with the embodiment of the present invention, FIG. 4 is a front view illustrating that a cushion cover is connected to the airbag cushion in accordance with the embodiment of the present invention, FIG. 5 is a rear view illustrating that the cushion cover is connected to the airbag cushion in accordance with the embodiment of the present invention, FIG. 6 is a front view illustrating that both sides of the airbag cushion in accordance with the embodiment of the present invention are folded to form side folding parts, FIG. 7 illustrates a fixing part for maintaining the folded state of the side folding part in accordance with the embodiment of the present invention, FIG. 8 is a rear view illustrating that both sides of the airbag cushion in accordance with the embodiment of the present invention are folded to form the side folding parts, FIG. 9 illustrates that an inflator is coupled to the airbag cushion and the cushion cover in accordance with the embodiment of the present invention, FIG. 10 illustrates that a roll folding part is formed at the bottom of the airbag cushion in accordance with the embodiment of the present invention, FIG. 11 illustrates that the top of the airbag cushion in accordance with the embodiment of the present invention is folded toward the roll folding part, FIG. 12 illustrates that the cushion cover is assembled to the airbag cushion in accordance with the embodiment of the present invention, FIG. 13 illustrates a cushion pack in accordance with the embodiment of the present invention, FIG. 14 illustrates that the cushion pack is separated from the housing in accordance with the embodiment of the present invention, FIG. 15 illustrates that the cushion pack is coupled to the housing in accordance with the embodiment of the present invention, and FIG. 16 illustrates the location of a cutting line with the cushion pack mounted in the housing in accordance with the embodiment of the present invention.

As illustrated in FIGS. 2 and 3, the knee airbag apparatus 1 in accordance with the embodiment of the present invention may include a housing 10, an airbag cushion 20, a cushion cover 30, a fixing part 40 and an inflator 50.

As illustrated in FIGS. 2 and 14, a housing 10 may be disposed in a dashboard 7 positioned in front of the knee of a passenger 5, and the inflator 50, the airbag cushion 20 and the like may be mounted in the housing 10. The housing 10 in accordance with an embodiment may include a housing body 12 having a mounting groove 14 for mounting the inflator 50 and a support piece 16 extended from the housing body 12 and fixed to the vehicle body.

The airbag cushion 20 may be connected to the inflator 50 and installed in the mounting groove 14, and the cushion cover 30 may be installed while covering the outside of the folded airbag cushion 20.

As illustrated in FIGS. 3 to 9, the airbag cushion 20 may be connected to the inflator 50, and formed and folded in various manners, as long as the airbag cushion 20 can be expanded by gas received through an operation of the inflator 50 and deployed toward the knee of the passenger 5.

The airbag cushion 20 in accordance with an embodiment may be manufactured through a folding method which folds both sides of a cushion body 22 connected to the inflator 50 in a widthwise direction W by a plurality of times, forms a roll folding part 26 by rolling one side of the folded portions of the cushion body 22, and folds the other side of the cushion body 22 toward the roll folding part 26.

A side folding part 24 may be formed at both sides of the cushion body 22 in the widthwise direction W, the cushion body 22 being connected to the inflator 50 and expanded by the gas generated through the inflator 50. The side folding part 24 may be formed by folding both sides of the cushion body 22 in a zigzag manner. The folded state of the side folding part 24 may be maintained by a fixing part 40.

The cushion body 22 of the airbag cushion 20 may be unfolded in such a manner that a side coupled to a fixing bolt 54 of the inflator 50 faces upward, and both sides of the cushion body 22 in the widthwise direction W may be folded in a zigzag manner so as to form the side folding parts 24. For example, one side of the cushion body 22 in the widthwise direction W may be folded in such a manner that the end thereof is positioned in the center of the cushion body 22, and then folded in the opposite direction so as to form the side folding part 24 at the one side of the cushion body 22. Through a similar method, the side folding part 24 may be formed at the other side of the cushion body 22 in the widthwise direction W. The number of times to fold the cushion body 22 to form the side folding part 24 may be changed depending on the size and shape of the airbag cushion 20.

With the side folding parts 24 formed at both sides of the cushion body 22, a roll folding part 26 may be formed by rolling one side of the cushion body 22 in the longitudinal direction D toward the other side of the cushion body 22 in the longitudinal direction D. The roll folding part 26 and the other side of the airbag cushion 20 may be spaced from each other by a preset distance L. For example, when the roll folding part 26 is formed by rolling one side of the cushion body 22 up to the center of the cushion body 22 in the longitudinal direction D, a half of the entire length of the cushion body 22 in the longitudinal direction D may be set to the distance L. However, this is only an example, and the range of the distance L can be changed to various ranges.

The other side of the airbag cushion 20 may be folded toward the roll folding part 26 and cover the outside of the roll folding part 26. Then, the folding operation of the airbag cushion 20 may be completed. That is, after the side folding parts 24 are formed at both sides of the airbag cushion 20, the roll folding part 26 may be formed at the bottom of the airbag cushion 20. Then, through the folding operation of covering the outside of the roll folding part 26 by folding the upper portion of the airbag cushion 20 downward, the airbag cushion 20 may be completely folded.

The cushion cover 30 may be connected to the airbag cushion 20 and the inflator 50, and formed in various manners, as long as the cushion cover 30 can be torn to form a passage for the deployment of the airbag cushion 20 when the airbag cushion 20 is deployed. The cushion cover 30 in accordance with an embodiment may be formed of a flexible material such as nylon, and include a cover body 32 and a connection part 34.

The cover body 32 may be fixed to the rear surface of the cushion body 22, and a cutting line 36 may be horizontally formed inside the cover body 32. The cutting line 36 may be cut by a predetermined external force, and form a passage for the deployment of the airbag cushion 20. The cover body 32 may have a mounting hole 33 formed at the bottom thereof, such that the body of the inflator 50 is inserted into the mounting hole 33. Therefore, with the inflator 50 installed in the airbag cushion 20, one end of the inflator 50 may be protruded to the outside of the airbag cushion 20 through the hole formed in the airbag cushion 20, and stuck in the mounting hole 33 of the cover body 32.

The connection part 34 may be protruded from the cover body 32 and include a connection hole 35 connected to the fixing bolt 54 of the inflator 50. Therefore, after the cushion cover 30 and the airbag cushion 20 form a module through the completion of the folding operation, the connection part 34 of the cushion cover 30 may be connected to the fixing bolt 54 of the inflator 50 while covering the outside of the module. Thus, the module shape in which the airbag cushion 20 and the cushion cover 30 are connected to the inflator 50 can be maintained.

That is, the cushion cover 30 may be installed outside the airbag cushion 20, and the airbag cushion 20 and the cushion cover 30 may be folded together and connected to the fixing bolt of the inflator 50, which makes it possible to save time for separately installing the cushion cover 30. When the airbag cushion 20 is asymmetrically deployed, the position and length of the cutting line 36 formed on the cover body 32 can be changed to induce symmetrical deployment of the airbag cushion 20.

The connection part 34 may be positioned at the top of the cover body 32, and the mounting hole 33 may be formed at the bottom of the cover body 32.

The fixing part 40 may be installed through the side folding part 24, and maintain the folded state of the side folding part 24. Furthermore, the fixing part 40 may be formed of plastics, one side of the fixing part 40 may be fixed to the top surface of the side folding part 24, and the other side of the fixing part 40 may be fixed to the bottom surface of the side folding part 24. The fixing part 40 formed in an H-shape may include a hang-tag. When a predetermined force or more is applied, the fixing part 40 may be cut to allow expansion of the airbag cushion 20.

The inflator 50 may be modified in various shapes, as long as the inflator 50 can be installed in the housing 10 and inject gas. The inflator 50 positioned in the airbag cushion 20 may be connected to the airbag cushion 20 and the cushion cover 30 so as to form a cushion pack 60 as one module, and coupled to the housing 10.

The inflator 50 may be installed in the housing body 12, and serve to inject gas. The inflator 50 may have an outlet 52 formed at one side thereof, the outlet 52 being used for discharging gas, and the fixing bolt 54 protruded outward from the body of the inflator 50 may be protruded to the outside of the airbag cushion 20 through the airbag cushion 20, and passed through the connection hole 35 formed in the connection part 34 of the cushion cover 30. Since the outlet 52 of the inflator 50 is eccentrically installed, the position of the cutting line 36 of the cushion cover 30 may be adjusted to symmetrically deploy the airbag cushion 20.

Hereafter, a method for folding the knee airbag apparatus 1 in accordance with an embodiment of the present invention will be described in detail with reference to the accompanying drawings.

As illustrated in FIGS. 1 to 8, the method for folding the knee airbag apparatus 1 in accordance with the embodiment of the present invention may include folding both sides of the airbag cushion 20 a plurality of times and fixing the folded portions of the airbag cushion 200.

That is, the cushion cover 30 may be coupled to the airbag cushion 20, and both sides of the airbag cushion 20 in the widthwise direction W may be folded in a zigzag manner so as to form the side folding parts 24, at step S10. The side folding parts 24 may be formed by folding both sides of the airbag cushion 20 a plurality of times. In an embodiment, each of the side folding parts 24 may be formed by folding the airbag cushion 20 twice.

After the side folding parts 24 are formed, the folded state of the side folding parts 24 may be fixed by the fixing part 40 installed through the side folding parts 24. The fixing part 40 may be installed in the top-to-bottom direction of the airbag cushion 20 having the side folding parts 24 formed therein, in order to prevent unfolding of the side folding parts 24 when a force smaller than a predetermined external force is applied.

As illustrated in FIG. 10, the method may include forming the roll folding part 26 by rolling one side of the airbag cushion 20 in the longitudinal direction D, the airbag cushion 20 having both sides folded a plurality of times, after the forming of the side folding parts 24. The roll folding part 26 may be formed by rolling the bottom of the airbag cushion 20. The roll folding part 26 may be formed up to a location separated from the airbag cushion 20 by the preset distance L. In the forming of the roll folding part 26, the roll folding part 26 and the other side of the airbag cushion 20 may be separated from each other by the preset distance L, thereby forming a space in which the other side of the airbag cushion 20 is folded toward the roll folding part 26.

As illustrated in FIG. 11, the method may include folding the other side of the airbag cushion 20 toward the roll folding part 26 and fixing the other side of the airbag cushion 20, with the roll folding part 26 formed at the one side of the airbag cushion 20, at step S30. The other side of the airbag cushion 20 may be folded toward the roll folding part 26 so as to cover the outside of the roll folding part 26.

As illustrated in FIGS. 12 to 16, the cushion cover 30 may be installed outside the airbag cushion 20, and the airbag cushion 20 and the cushion cover 30 may be folded together. After the folding of the cushion body 22 toward the roll folding part 26 at step S30, the method may include assembling the cushion cover 30 to the inflator 50 by connecting the connection part 34 of the cushion cover 30 connected to the airbag cushion 20 to the fixing bolt 54 installed in the inflator 50, at step S40. Therefore, the airbag cushion 20, the cushion cover 30 and the inflator 50 may form the cushion pack 60 as a module. Since the cushion pack 60 is inserted and mounted into the mounting groove 14 of the housing body 12, the assembling process can be simplified.

When the cushion pack 60 is installed in the housing body 12, the cutting line 36 of the cushion cover 30 may be installed toward the front of the housing body 12. Therefore, when the airbag cushion 20 is deployed through a torn portion of the cutting line 36, asymmetrical deployment of the airbag cushion 20 can prevented. Thus, the airbag cushion 20 can be more stably deployed.

Since the process of folding the airbag cushion in a zigzag manner in the entire airbag manufacturing process is difficult to automate, the portions of the airbag cushion 20, folded in a zigzag manner during the folding process, can be minimized, and the process of forming the roll folding part 26 and the process of installing the cushion cover 30, which can be easily automated, can be added to improve the productivity.

In accordance with the present embodiment, the side folding parts 24 may be formed at the left and right sides of the airbag cushion 20, the roll folding part 26 may be formed by rolling the lower portion of the cushion body 22, and the upper portions of the side folding parts 24 may be folded toward the roll folding part 26. Therefore, most of the folding operations can be automated to improve the productivity. Furthermore, since the cutting line 36 of the cushion cover 30 for forming the deployment passage of the airbag cushion 20 is horizontally formed in the cover body 32, the airbag cushion 20 deployed through a torn portion of the cutting line 36 may be symmetrically deployed, which makes it possible to prevent distortion or swaying of the airbag cushion 20 while the airbag cushion 20 is deployed. Furthermore, the knee airbag apparatus 1 can simplify and automate the folding process of the airbag cushion 20 while guaranteeing the deployment stability of the existing airbag apparatus. Therefore, it is possible to reduce the manufacturing cost.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method for folding a knee airbag, comprising:
   folding both sides of an airbag cushion a plurality of times, and fixing the folded portion of the airbag cushion;
   forming a roll folding part by rolling one side of the airbag cushion of which both sides are folded a plurality of times; and
   folding the other side of the airbag cushion toward the roll folding part, with the roll folding part formed at the one side of the airbag cushion, and fixing the other side of the airbag cushion.

2. The method of claim 1, wherein both sides of the airbag cushion are folded in a zigzag manner so as to form side folding parts.

3. The method of claim 2, wherein the folded state of the side folding part is maintained by a fixing part installed through the side folding part.

4. The method of claim 1, wherein in the forming of the roll folding part, the roll folding part and the other side of the airbag cushion are separated from each other by a preset distance.

5. The method of claim 4, wherein the other side of the airbag cushion is folded toward the roll folding part so as to cover the outside of the roll folding part.

6. The method of claim 1, wherein a cushion cover is installed outside the airbag cushion, and the airbag cushion and the cushion cover are folded and connected to a fixing bolt of an inflator.

7. A knee airbag apparatus comprising:
   an inflator installed in a housing and configured to inject gas;
   an airbag cushion having a cushion body of which both sides are folded a plurality of times to form side folding parts, the cushion body being connected to the inflator, wherein a roll folding part is formed by rolling one side of the folded portion of the cushion body, and the other side of the cushion body is folded toward the roll folding part;
   a cushion cover connected to the airbag cushion, and torn to form a passage in which the airbag cushion is deployed, when the airbag cushion is deployed; and
   a fixing part installed through each of the side folding parts so as to maintain the folded state of each of the side folding parts.

8. The knee airbag apparatus of claim 7, wherein both sides of the cushion body in the airbag cushion are folded in a zigzag manner so as to form the side folding parts.

9. The knee airbag apparatus of claim 7, wherein the cushion cover comprises:
   a cover body fixed to a rear surface of the cushion body; and
   a connection part protruded from the cover body, and having a connection hole connected to a fixing bolt of the inflator,
   wherein a cutting line is horizontally formed inside the cover body.

* * * * *